United States Patent
D'Ambrosio et al.

(10) Patent No.: US 8,669,854 B2
(45) Date of Patent: Mar. 11, 2014

(54) DETERMINATION AND SIGNALLING TO A DRIVER OF A MOTOR VEHICLE OF A POTENTIAL COLLISION OF THE MOTOR VEHICLE WITH AN OBSTACLE

(75) Inventors: Carlo D'Ambrosio, Orbassano (IT); Andrea Ghiro, Orbassano (IT)

(73) Assignee: C.R.F. Societá Consortile per Azioni (IT)

( * ) Notice: Subject to any disclaimer, the term of this patent is extended or adjusted under 35 U.S.C. 154(b) by 1085 days.

(21) Appl. No.: 12/622,786

(22) Filed: Nov. 20, 2009

(65) Prior Publication Data

US 2010/0127841 A1    May 27, 2010

(30) Foreign Application Priority Data

Nov. 25, 2008  (EP) .................................... 08425751

(51) Int. Cl.
*B60Q 1/00*    (2006.01)

(52) U.S. Cl.
USPC .......... 340/435; 340/903; 340/904; 340/933; 340/936; 340/437; 340/438; 340/439; 340/441

(58) Field of Classification Search
USPC ................. 340/436, 435, 903, 904, 933, 936, 340/425.5, 437, 438, 439, 441
See application file for complete search history.

(56) References Cited

U.S. PATENT DOCUMENTS

| | | |
|---|---|---|
| 5,585,798 A | 12/1996 | Yoshioka et al. |
| 5,818,355 A | 10/1998 | Shirai et al. |
| 6,442,484 B1 | 8/2002 | Miller et al. |
| 2007/0132567 A1 * | 6/2007 | Schofield et al. ............. 340/438 |

FOREIGN PATENT DOCUMENTS

GB    2413449 A    10/2005

OTHER PUBLICATIONS

"European Application Serial No. 08425751.8, European Search Report dated May 8, 2009", 3 pgs.

* cited by examiner

*Primary Examiner* — Daryl Pope
(74) *Attorney, Agent, or Firm* — Schwegman Lundberg & Woessner, P.A.

(57) ABSTRACT

Described herein is a method for determining and signalling to a driver of a motor vehicle a condition of danger deriving from a potential collision of the motor vehicle itself with an obstacle. The method is able to: determine a path of travel of the motor vehicle along a stretch of road; define an area of detection of the obstacles in the stretch of road; detect the obstacles present in the area of detection in such a way as to generate a list of possible obstacles that might be hit; identify, from among the possible obstacles detected, a main obstacle; determine a level of risk associated to a condition of impact of the motor vehicle with the main obstacle detected; and finally generate a signal or alarm message regarding the level of risk determined.

13 Claims, 3 Drawing Sheets

DETERMINATION AND SIGNALLING TO A DRIVER OF A MOTOR VEHICLE OF A POTENTIAL COLLISION OF THE MOTOR VEHICLE WITH AN OBSTACLE

CLAIM OF PRIORITY

This application claims the benefit of priority, under 35 U.S.C. Section 119, to European Patent Application Ser. No. 08425751.8, filed on Nov. 25, 2008, which is incorporated herein by reference in its entirety.

TECHNICAL FIELD

The present subject matter relates to determination and consequent signalling to a driver of a motor vehicle of a potential collision of the motor vehicle with an obstacle.

BACKGROUND

In the context of road safety there is increasingly the need to furnish the drivers of motor vehicles with an aid that will enable timely detection of a condition of potential collision between the motor vehicle and a road "obstacle" so as to warn the driver himself of a state of danger.

It is helpful to be able to signal in advance to the driver a condition of potential head-on collision between the motor vehicle and obstacles present along the road travelled along by the motor vehicle itself such as, for example, pedestrians, and/or cyclists, and/or motorcyclists, and/or motor vehicles, or any other object/element present on the road.

For this purpose numerous efforts have been made in the last few years in the automobile sector to identify apparatuses for detection of possible head-on collision of the motor vehicle with other road obstacles, but there still remains much to be done.

SUMMARY

The present subject matter can help provide an apparatus and a method that will enable determination and signalling in advance to the driver of the motor vehicle of a potential collision with an obstacle.

The present subject matter can relate to a method designed to determine and signal to the driver of a motor vehicle a condition of danger deriving from the presence of obstacles, such as according to the attached Claims.

Moreover provided according to an example of the present subject matter is a computer system for automobiles for determining and signalling to the driver of a motor vehicle a condition of danger deriving from a potential collision of the motor vehicle itself with an obstacle located along a path of the motor vehicle, such as according to the attached Claims.

Further provided according to an example of the present subject matter is a motor vehicle such as according to the attached Claims.

Finally provided according to an example of the present subject matter is a software program such as according to the attached Claims.

BRIEF DESCRIPTION OF THE DRAWINGS

The present subject matter will now be described with reference to the annexed drawings, which illustrate a non-limiting example of embodiment thereof and in which.

DETAILED DESCRIPTION

Figure 1:
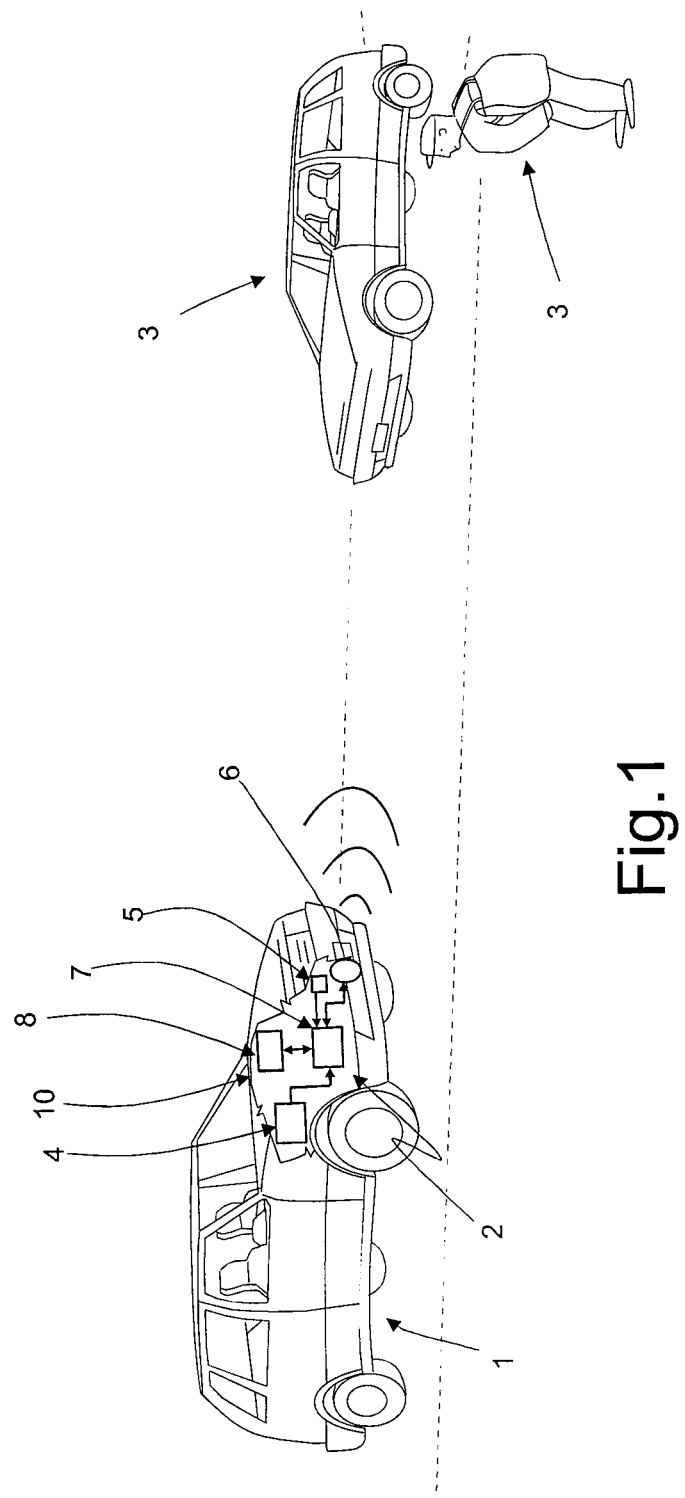
FIG. 1 is a schematic illustration of a motor vehicle provided with an apparatus for determining and signalling to the driver of a motor vehicle a potential collision with a road obstacle, built according to the present invention.

With reference to FIG. 1, designated as a whole by number 1 is a land vehicle, in particular an automobile, which is provided with a computer system 2 having the function of detecting and signalling to the driver of the motor vehicle 1 itself a condition of danger or alarm deriving from a foresight of collision or impact between the motor vehicle 1 and a road obstacle 3 so as to achieve a higher degree of road safety for the driver of the motor vehicle 1 himself.

The obstacle 3 can correspond preferably but not necessarily to a pedestrian, and/or a cyclist, and/or a motorcyclist, and/or a motor vehicle or any other element/object located on the road in a position such that it might come into collision with the motor vehicle 1.

In the example illustrated in FIG. 1, the computer system 2 comprises a sensor system 4, which is housed in the motor vehicle 1 for measuring a set of parameters regarding the displacement of the motor vehicle, and/or for determining a set of parameters regarding the behaviour of the driver in terms of driving of the motor vehicle, and/or for acquiring images of the road obstacles or for determining the position thereof.

In greater detail, the sensor system 4 comprises a sensor for measuring the speed v of the motor vehicle 1, a sensor for measuring the yaw, indicated with the term YAW, of the motor vehicle 1, a sensor for measuring the pitch, indicated with the term TILT, of the motor vehicle 1, a sensor for measuring the speed LWV of steering of the motor vehicle 1 by the driver, and a sensor for measuring the angle LWA of steering of the motor vehicle 1.

In the example illustrated in FIG. 1, the sensor system 4 moreover comprises an image-acquisition device 5, such as, for example, a video camera, a device 6 for detecting the distance of road obstacles, such as for example a radar, and/or an integrated satellite navigation system containing one or more road maps (not illustrated).

The computer system 2 moreover comprises an information system 10, which is configured for receiving the parameters measured by the sensor system 4 and determines, according to said parameters, a condition of danger deriving from a potential collision of the motor vehicle 1 itself with the obstacle 3 located along a path of the motor vehicle 1, so as to signal the existence of the obstacle 3 to the driver of the motor vehicle 1.

In particular, the information system 10 comprises a processing unit 7, which receives at input parameters measured by the sensor system 4 and processes them in such a way as to determine the condition of potential collision between the motor vehicle 1 and an obstacle 3.

In detail, the processing unit 7 comprises an electronic control unit, provided, for example, with a microprocessor, and configured for implementing the steps of the method for detection and signalling of road obstacles, described in detail in what follows.

The computer system 2 moreover comprises a signalling system 8, which co-operates with the processing unit 7 for receiving a danger signal associated to a level of risk of impact with an obstacle 3, and signals to the driver of the motor vehicle 1 a condition of danger.

The signalling system 8 preferably but not necessarily comprises an acoustic apparatus for generating vocal messages of danger, and/or a display device for displaying messages that can be perceived by the user, and/or a haptic device that is able to issue a warning that can be perceived by the user, or any other similar device that is able to warn the user of the condition of danger.

Figure 2:
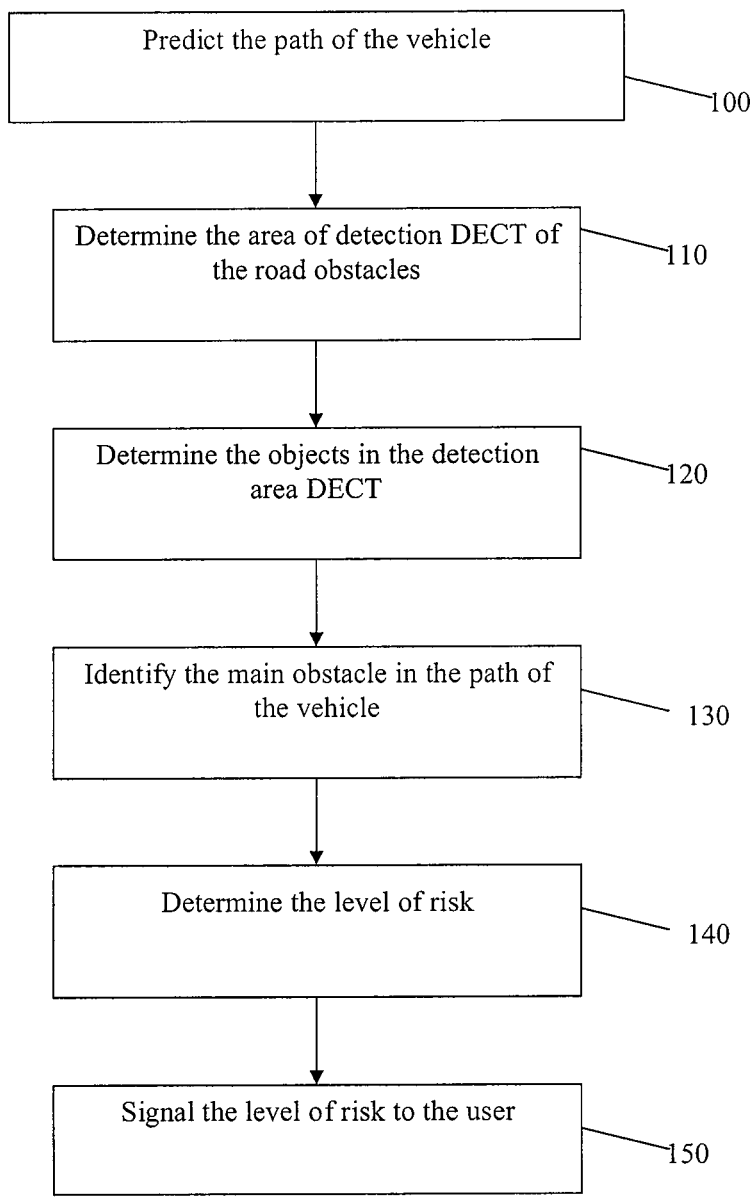
FIG. 2 illustrates a flowchart indicating the operations implemented by the apparatus illustrated in FIG. 1 during its operation; whilst

With reference to FIG. 2, the method implemented by the processing unit 7 estimates the path T of the motor vehicle (Block 100) in the course of its displacement along the stretch of road.

In the case in point, the calculation of the path T of the motor vehicle 1 envisages a procedure of analysis of the lateral dynamic displacement of the motor vehicle 1 that makes a prediction of possible paths followed by the motor vehicle in the course of its travel along the road, and a procedure for calculation of the path that, on the basis of the aforesaid paths, i.e., the estimated paths, and on the basis of the information correlated to the images acquired by the camcorder and/or by the satellite navigation system, establishes the predicted path T of the road that will be travelled along by the motor vehicle 1.

In detail, the procedure of analysis of the lateral dynamic displacement of the motor vehicle 1 envisages receiving at input the following parameters of measurement: the speed v of the motor vehicle 1, the steering speed LWV, the steering angle LWA, and YAW. The estimation procedure then processes the parameters v, LWV, LWA, and YAW to supply at output the estimated path T of road.

The procedure of analysis of the lateral dynamic displacement of the motor vehicle 1 moreover processes the steering speed LWV, the steering angle LWA, and the yaw YAW to supply at output: a first longitudinal component of speed of the motor vehicle vx along a reference axis X substantially parallel to the longitudinal axis of the motor vehicle 1; a second transverse component of speed of the motor vehicle vy along a reference axis Y substantially perpendicular to the longitudinal axis of the motor vehicle 1; the positions of the centre of gravity of the motor vehicle CoGx and CoGy determined with respect to the reference axes X and Y; an angle of yaw psi of the motor vehicle; an estimate of the radius of curvature RMOD of the estimated path; and a parameter $r_{homod}$ associated to the curvature of the estimated path T of road travelled along.

In greater detail, the path T of the motor vehicle 1 is determined on the basis both of the information correlated to the images acquired by the camcorder and according to the paths estimated by the procedure of analysis of the lateral dynamic displacement.

In particular, the calculation procedure determines, from among the different paths estimated, the path characterized by a greater level of reliability of travel. In particular, the estimate of the predicted path T is essentially based upon the reliability of the information supplied by the image-acquisition device 5 and upon the evaluation of the actions being undertaken by the driver of the motor vehicle 1. Said path is characterized by a curvature $r_{ho}$ and by an angle of yaw m of the motor vehicle 1 with respect thereto.

Once the path T of road travelled along by the motor vehicle 1 has been identified, the method determines the area of detection DECT of the obstacles 3 (Block 110).

Figure 3:
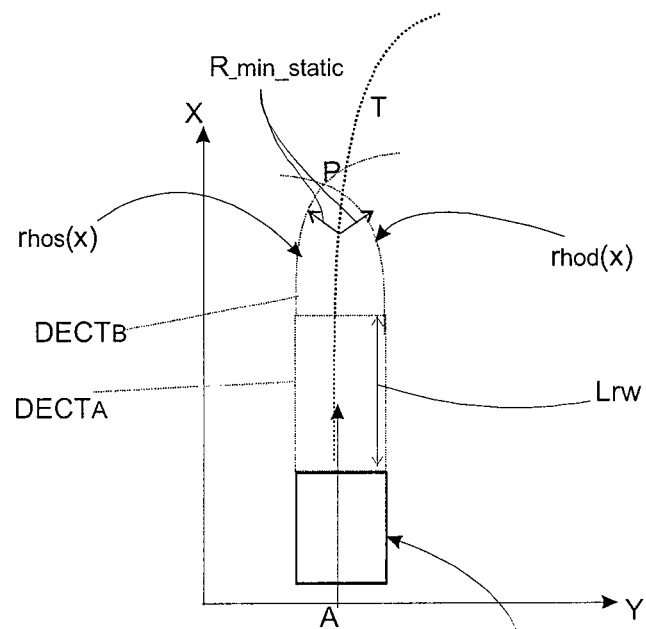
FIGS. 3 and 4 show as many examples of the area of detection of obstacles, in the condition where the vehicle is moving and in the condition where the vehicle is stationary, respectively.
Figure 4:
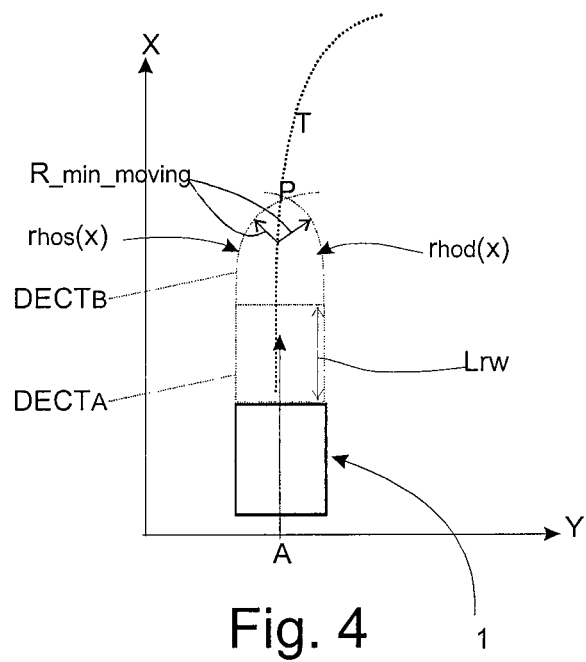

With reference to FIG. 3, in the case where the obstacle 3 is stationary, the method assigns to the area of detection DECT a minimum radius of curvature equal to R_min_static (FIG. 3), or alternatively, in the case where the obstacle 3 is moving, assigns a second minimum radius of curvature equal to R_min_moving (FIG. 4).

In greater detail, the method delimits the area of detection DECT by determining two portions.

A first portion $DECT_A$ has a substantially rectangular shape, extends at the front of the motor vehicle 1 in a direction substantially parallel to the longitudinal axis A, and has a length equal to a length Lrw. It should be pointed out that the length Lrw is determined according to the information supplied by the image-acquisition device 5, and/or to the vehicle speed, and/or to the speed of the steering angle LWA.

The second portion $DECT_B$ is connected to the first portion and is delimited by two lateral curves $r_{hos}(x)$ and $r_{hod}(x)$ that extend from the end of the first portion $DECT_A$ in such a way that both of them prolong in a direction substantially parallel to the longitudinal axis A of the motor vehicle 1 and intersect the longitudinal axis A, on the opposite side of the motor vehicle 1, in a point of intersection P.

In particular, the method calculates the two intersection curves $r_{hos}(x)$ and $r_{hos}(x)$ that delimit the area of detection DECT in the reference system X, Y using the following function:

$$f(x) = mx + r_{ho} x^2.$$

At this point the method detects the road objects present within the area of detection DECT determined in the preceding step (Block 120).

In particular, the method processes the images furnished by the camcorder 5 and the information of distance detected by the radar 6 for identifying the position and the dimensions of the road obstacles present in the area of detection DECT itself. In greater detail, in this step the method jointly processes the information on the obstacles deduced from the images acquired by the camcorder 5, and the information regarding the distance of the obstacles 3 from the motor vehicle 1 obtained from the radar 6 so as to identify the road obstacles present in the area of detection DECT and the corresponding positions/dimensions.

At this point, the method makes a prediction of collision between the motor vehicle 1 and one of the obstacles 3 detected in the preceding step, referred to hereinafter as "obstacle 3".

Next, the method determines a level of risk associated to the predicted collision between the motor vehicle 1 and the obstacle 3.

In particular, the method determines two levels of risk associated to the detected obstacle 3, in which a first level of risk is associated to a "non-imminent" risk of impact, whilst the second level is associated to an "imminent" risk of collision.

In greater detail, in the case where the first level of risk is detected, the processing unit 7 issues a command to the sensor system 8 for generation of a signal/message that can indicate, for example, to the user to proceed with particular care and/or reduce the speed of the motor vehicle.

In the case where the second level of risk is detected, the processing unit 7 issues a command to the sensor system 8 for generation of a signal/message indicating to the user to brake or act on the steering wheel in a timely way so as to avoid the obstacle 3.

The method determines the level of risk to be assigned to the obstacle 3 detected on the basis of a set of parameters such as: time of reaction of the driver, speed v of the motor vehicle, speed of the obstacle 3, distance between the motor vehicle 1 and the obstacle 3, safety distance between the motor vehicle 1 and the obstacle 3, and a parameter associated to the deceleration to be performed on the motor vehicle 1 in order to drive said motor vehicle in conditions of safety.

The advantages deriving from the apparatus 2 described above emerge clearly: the apparatus 2 warns the driver of the motor vehicle 1 in due time of the presence of a danger when a condition of potential impact between the motor vehicle 1 and an obstacle 3 is predicted. Said signalling in fact enables the driver to set himself with sufficient advance in a condition of attention and of particular care in driving in the case where a road object is detected in the path of the motor vehicle, which, however, does not entail the risk of impact, or else to perform a timely manoeuvre to avoid collision with the road obstacle itself.

Finally, it is clear that modifications and variations can be made to the apparatus described and illustrated herein, without thereby departing from the scope of the present invention as defined in the annexed claims.

The invention claimed is:

1. A method for determining and signalling to a driver of a motor vehicle a potential collision with an obstacle located along the path of the motor vehicle itself, the method comprising:
   a) estimating the path (T) of the motor vehicle along a stretch of road;
   b) defining an area of detection of obstacles (DECT) in the stretch of road;
   c) determining obstacles in the area of detection of obstacles (DECT);
   d) identifying a main obstacle from among the obstacles detected;
   e) determining a level of risk associated to a potential collision of the motor vehicle with the main obstacle; and
   f) warning the driver on the basis of the level of risk determined,.
   wherein determining a level of risk associated to a potential collision of the motor vehicle with the main obstacle comprises determining a first level of risk or a second level of risk; and wherein warning the driver on the basis of the level of risk determined comprises generating, when the level of risk determined corresponds to the first level of risk, a signal or message indicating to the user to reduce the speed of the motor vehicle, or generating, when the level of risk determined corresponds to the second level of risk, a signal or a message indicating to the user to apply the brakes and/or act on the steering wheel so as to avoid the road obstacle.

2. The method according to claim 1, wherein determining a level of risk associated to a potential collision of the motor vehicle with the main obstacle comprises:
   determining the level of risk according to at least one of the following parameters:
   time of reaction of the driver;
   speed of the motor vehicle;
   speed of the main road obstacle;
   distance between the motor vehicle and the main road obstacle;
   a safety distance between the motor vehicle and the main road obstacle; and
   a parameter associated to the deceleration to be performed on the motor vehicle for driving the motor vehicle in conditions of safety.

3. The method according to claim 2, wherein determining a level of risk associated to a potential collision of the motor vehicle with the main obstacle comprises determining a first level of risk or a second level of risk; and wherein warning the driver on the basis of the level of risk determined comprises generating, when the level of risk determined corresponds to the first level of risk, a signal or message indicating to the user to reduce the speed of the motor vehicle.

4. The method according to claim 3, wherein determining a level of risk associated to a potential collision of the motor vehicle with the main obstacle comprises determining a first level of risk or a second level of risk; and wherein warning the driver on the basis of the level of risk determined comprises generating, when the level of risk determined corresponds to the second level of risk, a signal or a message indicating to the user to apply the brakes and/or act on the steering wheel so as to avoid the road obstacle.

5. The method according to claim 1, wherein determining a level of risk associated to a potential collision of the motor vehicle with the main obstacle comprises determining a first level of risk or a second level of risk; and wherein warning the driver on the basis of the level of risk determined comprises generating, when the level of risk determined corresponds to the first level of risk, a signal or message indicating to the user to reduce the speed of the motor vehicle, and, generating, when the level of risk determined corresponds to the second level of risk, a signal or a message indicating to the user to apply the brakes and/or act on the steering wheel so as to avoid the road obstacle.

6. The method according to claim 1, wherein the step b) comprises assigning to the area of detection (DECT) a first radius of curvature (R_min_static) in the case where the main road obstacle is stationary, or alternatively, a second radius of curvature (R_min_moving) different from the first radius of curvature (R_min_static) in the case where the main road obstacle is moving.

7. The method according to claim 6 wherein the step b) comprises calculating a first portion of area of detection ($DECT_A$) and a second portion of area of detection ($DECT_B$).

8. The method according to claim 7, wherein the first area of detection ($DECT_A$) has a substantially rectangular shape, extends at the front of the motor vehicle in a direction substantially parallel to a longitudinal axis (A) of the motor vehicle, and has a length (Lrw) determined according to a set of information supplied by image-acquisition means (5), and/or to the speed of the motor vehicle, and/or to the steering angle speed (LWA) of the motor vehicle itself.

9. The method according to claim 8, wherein the second portion ($DECT_B$) is delimited by two lateral curves ($r_{hos}(x)$) and ($r_{hod}(x)$) that extend from the end of the first portion ($DECT_A$) in such that they both prolong in a direction substantially parallel to the longitudinal axis (A) of the motor vehicle, and intersect the longitudinal axis (A) in a intersection point (P).

10. The method according to claim 9, comprising the step of calculating the two curves of intersection ($r_{hos}(x)$, $r_{hod}(x)$) that delimit the second portion ($DECT_B$) of the area of detection (DECT) in a pre-set reference system (X, Y) via the following function:

$$f(x)=mx+r_{ho}\cdot x^2.$$

11. A computer system for automobiles, wherein it is configured for determining and signalling to a driver of a motor vehicle a condition of danger deriving from a potential collision of the motor vehicle itself with an obstacle located along a path (T) of the motor vehicle, as claimed in claim 1.

12. A motor vehicle wherein it comprises a sensor system that is able to detect parameters indicating the displacement of the motor vehicle, and a computer system configured for receiving the parameters indicating the displacement of the motor vehicle detected by the sensor system, and for determining and signalling to a driver of the motor vehicle, on the basis of the parameters, a condition of danger deriving from a potential collision of the motor vehicle itself with an obstacle located along a path of the motor vehicle, as claimed in claim 1.

13. A computer-program product loadable into an electronic processing unit of a computer system of a motor vehicle and configurable in such a way that, when run, the computer system determines and signals to the driver of a motor vehicle a condition of danger deriving from a potential collision of the motor vehicle itself with an obstacle located along a path (T) of the motor vehicle, as claimed in claim 1.

* * * * *